(12) United States Patent
Flake

(10) Patent No.: US 9,581,978 B1
(45) Date of Patent: Feb. 28, 2017

(54) ELECTRONIC SYSTEM WITH SERVO MANAGEMENT MECHANISM AND METHOD OF OPERATION THEREOF

(71) Applicant: Western Digital Technologies, Inc., Irvine, CA (US)

(72) Inventor: Lance Flake, Longmont, CO (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 99 days.

(21) Appl. No.: 14/574,339

(22) Filed: Dec. 17, 2014

(51) Int. Cl.
*G05B 11/28* (2006.01)
*G05B 11/01* (2006.01)

(52) U.S. Cl.
CPC ................................. *G05B 11/011* (2013.01)

(58) Field of Classification Search
CPC ........................................................ H02P 7/29
USPC ........ 318/599, 560, 811, 810, 807, 767, 727
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |

(Continued)

Primary Examiner — David S Luo

(57) ABSTRACT

An apparatus includes: a media; a head over the media; a head actuation motor (HAM) coupled to the head; control circuitry, coupled to the head actuation motor, including: a system-on-chip (SOC) configured to manage a control of the head actuation motor, a pulse width modulation (PWM) code bus, coupled to the SOC, configured to communicate the control of the HAM, and a power integrated circuit (PIC), coupled to the PWM code bus, configured to drive a HAM control signal.

27 Claims, 5 Drawing Sheets

(56) References Cited

U.S. PATENT DOCUMENTS

| | | |
|---|---|---|
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,034,479 B2 | 4/2006 | Bombaci et al. |
| 7,034,501 B1 * | 4/2006 | Thunes .................. H02M 1/14 318/810 |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McComack |
| 7,542,225 B1 | 6/2009 | Ding et al. |
| 7,548,392 B1 | 6/2009 | Desai et al. |
| 7,551,390 B1 | 6/2009 | Wang et al. |

(56) References Cited

U.S. PATENT DOCUMENTS

| | | |
|---|---|---|
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,991,584 B2 | 8/2011 | Dang et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,094,405 B1 * | 1/2012 | Ying .................. G11B 5/59627 360/77.04 |
| 8,107,187 B1 * | 1/2012 | Hong .................. G11B 5/5526 360/77.02 |
| 8,116,023 B1 | 2/2012 | Kupferman |
| 8,134,792 B2 * | 3/2012 | Ranmuthu ............ B82Y 10/00 360/51 |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,638,080 B2 | 1/2014 | Agrawal et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,836,396 B2 * | 9/2014 | Zhang ...................... H03K 7/08 327/172 |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

ELECTRONIC SYSTEM WITH SERVO MANAGEMENT MECHANISM AND METHOD OF OPERATION THEREOF

TECHNICAL FIELD

An embodiment relates generally to an electronic system, and more particularly to a system for servo data management.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Preserving the user data stored in the storage devices is of the utmost importance.

As recording technologies advance in hard disk drives, the performance and capacity has increased while the size has decreased. The pressure to produce smaller storage devices has led to the combining of integrated functions that can reside in a compatible technology. Many functions of the storage devices require analog control and sensitivity that cannot be provided by digital logic processes. The control interface between the digital functions and the analog control mechanisms continues to grow based on features and performance of the storage devices. The number of control bits in the control interface can increase the size of the packages and increase cost of the storage device.

DETAILED DESCRIPTION

Figure 1:
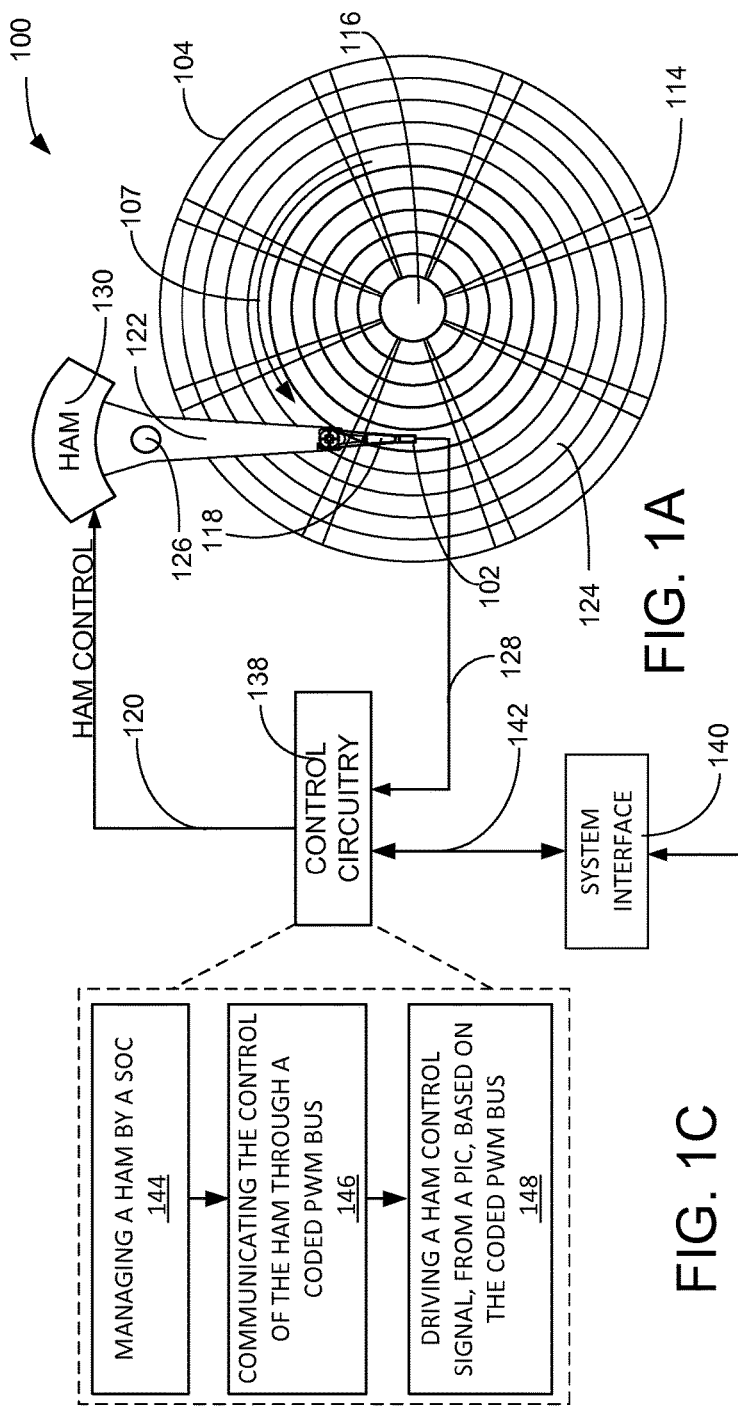
FIGS. 1A, 1B, and 1C show an operational diagram of an electronic system with servo management according to an embodiment.

Storage systems can include storage devices, such as hard disk drives (HDD) and hybrid drives utilizing magnetic recording heads in combination with non-volatile memory devices, that must manage analog control functions through pulse-width modulation (PWM). In order to control the media motor and position the heads correctly a number of analog controls must be subject to the manipulation by the controller. The response to the control of an analog circuit can be significantly longer than the response to digital logic because the analog circuitry is used to drive the movement of mechanical structures, such as the media motor and the and the head actuation motor (HAM), which can respond slowly.

Some embodiments can group sets of analog controls, that when activated can work together in a coordinated switching process. The control of the media motor can be grouped as pairs of transistors are managed in order to drive, sink, and sense the location of the media motor as it windings are manipulated to control the media speed.

It is understood that the control of the media motor can include passing current through three sets of coils used to create torque around the central hub of the media motor. By grouping the controls, the control of the media motor is simplified and can operate in a smoother and more tightly controlled process. During operation of the storage system, both the HAM and the media motor must be controlled in real-time.

A need still remains for an electronic system as an embodiment with servo management mechanism for managing the real-time controls of the media motor and the HAM during the operation of the data storage and retrieval tasks. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the various embodiments. It is to be understood that other embodiments would be evident based on the present disclosure, and that system, process, or mechanical changes may be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the various embodiments can be operated in any orientation. The various embodiments have been numbered first embodiment, second embodiment, etc. as a matter of descriptive convenience and are not intended to have any other significance or provide limitations for an embodiment.

Referring now to FIGS. 1A, 1B, and 1C, therein are shown an operational diagram of an electronic system 100 according to an embodiment. The electronic system 100 can represent an apparatus for one of the various embodiments. Various embodiments can include the embodiment depicted in FIGS. 1A, 1B, and 1C which by way of an example is shown as a hard disk drive although it is understood that the electronic system 100 can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

The electronic system 100 including a head 102 actuated over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information on data tracks 124. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive or a magnetic card reader.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably on the data tracks 124.

A media motor 116 can rotate the media 104, about a center of the media 104, at constant or varying speed 107. For illustrative purposes, the media motor 116 is described as a motor for a rotation, although it is understood that the media motor 116 can be other actuating motors for a tape drive, as an example.

As examples, a head actuation motor 130 can be a voice coil motor assembly, a stepper motor assembly, or a combination thereof. The head actuation motor 130 can generate a torque or force for positioning the head 102. The positional feedback for the head 102 can be provided to control circuitry 138 by reading servo sectors 114 from the media 104. The servo sectors 114 are distributed around the media 104 at intervals sufficient to allow proper positioning of the head 102 within the data tracks 124.

A tapered end of the flex arm 118 can support the head 102. The flex arm 118 can be mounted to the actuator arm 122, which is pivoted around a bearing assembly 126 by the torque generated by the head actuation motor 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by the control circuitry 138. The control circuitry 138 can measure a magnitude of the environmental disturbance, through the environmental sensor 136, and calculate a feed forward adjustment for the head actuation motor 130. The control circuitry 138 can control a head actuation motor (HAM) control signal 120 in order to manage the position of the head actuation motor 130.

The head 102 can be positioned over the media 104 along an arc shaped path between an inner diameter of the media 104 and outer diameter of the media 104. For illustrative purposes, the actuator arm 122 and the head actuation motor 130 are configured for rotary movement of the head 102. The actuator arm 122 and the head actuation motor 130 can be configured to have a different movement. For example, the actuator arm 122 and the head actuation motor 130 could be configured to have a linear movement resulting in the head 102 traveling along a radius of the media 104.

The head 102 can be positioned over the media 104 to create magnetic transitions or detect magnetic transitions from the data tracks 124 recorded in the coating layer that can be used to representing written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be nonvolatile random access memory (NVRAM) or Flash memory and a volatile storage can be static random access memory (SRAM) or dynamic random access memory (DRAM).

A system interface 140 can couple the control circuitry 138 to a host electronics (not shown). The system interface 140 can transfer host commands 142 between the host electronics and the control circuitry 138. The host commands 142 can be encoded or decoded by the control circuitry 138 in preparation for transfer to or from the media 104.

The control circuitry 138 can be configured to control the media motor 116 for adjusting the speed 107 of the media 104. The control circuitry 138 can be configured to cause the head 102 to move relative to the media 104, or vice versa. The control circuitry 138 can be configured to control the speed 107 of the media 104 by sensing the back electromotive force (EMF) of the media motor 116 and the position of the head 102 by reading the servo sectors 114 strategically placed on the media 104. The servo sectors 114 can be recorded on the media 104 during a manufacturing process. The control circuitry 138 can also be configured to control the flow of information to the head 102 for writing to the media 104. The information sent to the head 102 can include the preconditioning pattern, direct current erase signals, user data, or a combination thereof. The control circuitry 138 can retrieve the recorded information and monitor the servo sectors 114 through a read signal 128 provided by the head 102.

In an embodiment, the electronic system 100 further comprises control circuitry 138 configured to execute the flow diagrams of FIG. 1C. As an example, actions 144 to 148 can represent the flow diagram where an embodiment is employing a data management mechanism for maintaining data integrity.

In an action 144, the control circuitry 138 can manage the head actuation motor (HAM) 130 through a system on a chip (SOC) when the head 102 is flown over the media 104 during execution by the electronic system 100, such as a manufacturing test fixture, a hard disk drive, a tape drive, or a hybrid drive.

In an action 146, the SOC can generate a pulse-width modulation (PWM) code bus reflecting the operations required to communicate the control of the HAM. The bits in the PWM code bus can be coded to reflect a single operational step or a group of coordinated operational steps.

In an action 148, the HAM control signals are driven by a power integrated circuit (PIC) based on the PWM code bus. The PWM code bus can meet the performance requirements for all of the analog control functions in the electronic system 100, while reducing the pin count and package size required by the control circuitry 138.

It has been discovered that various embodiments of the electronic system 100 can improve the overall performance while reducing system cost and size. The electronic system 100 can manage the analog control requirements without adding additional package size or complicating the interconnect structure of the printed circuit board assembly of the control circuitry 138.

Figure 2:
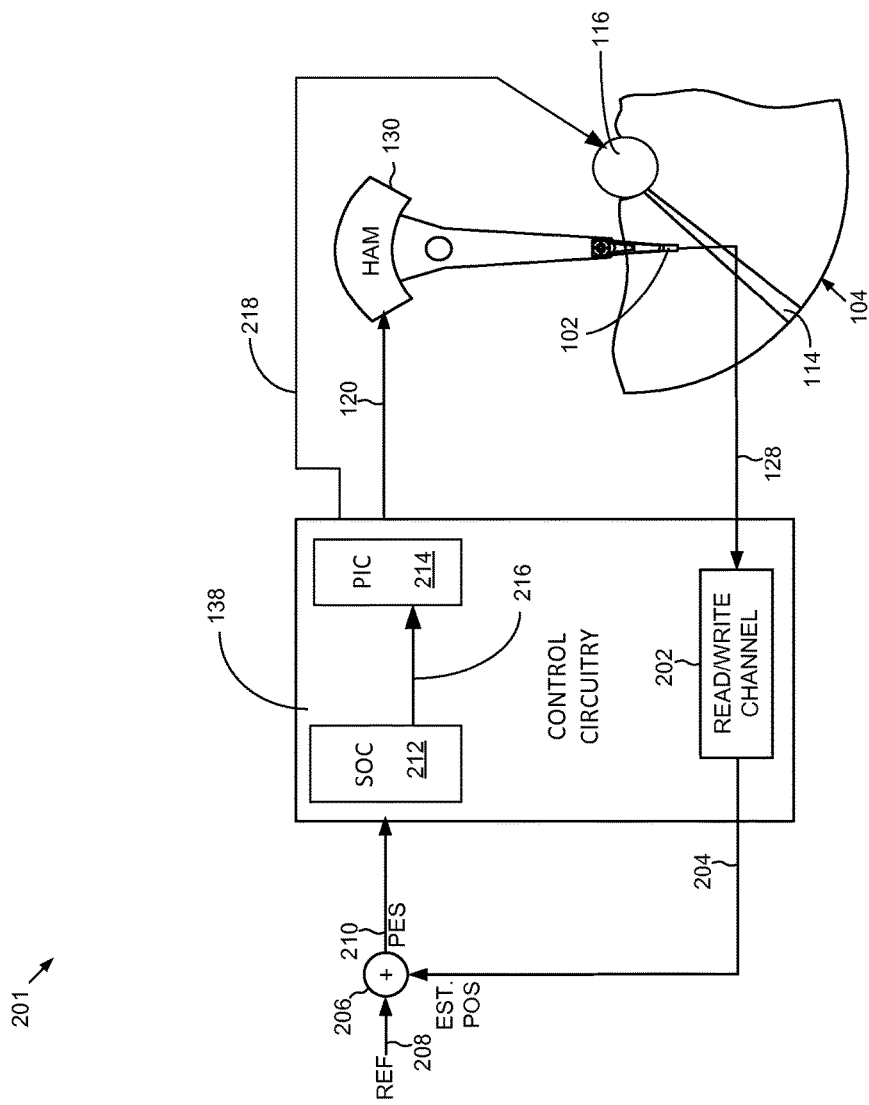
FIG. 2 shows a servo control system, of the electronic system, for controlling a head actuation motor and a media motor in accordance with an embodiment.

Referring now to FIG. 2, therein is shown a servo control system 201, of the electronic system 100, for controlling a head actuation motor 130 and a media motor 116 in accordance with an embodiment. The servo control system 201 controls the head actuation motor 130 in order to position the head assembly 102 radially over the media 104. A read/write channel 202 demodulates the read signal 128, from the servo sectors 114, into an estimated position 204 for the head assembly 102 relative to the data track 124 of FIG. 1A on the media 104. The estimated position 204 is applied to a first adder 206 for subtracting a reference position 208 in order to generate a position error signal (PES) 210. The control circuitry 138 can monitor the PES 210 in order to generate the HAM control signal 120.

As an example, the control circuitry 138 can include a system-on-a-chip (SOC) 212 that includes the digital functions supported by the electronic system 100. A power integrated circuit (PIC) 214 can be driven by the SOC 212 through a pulse-width modulation (PWM) code bus 216. The PIC 214 can drive a media motor control bus 218 for managing the commutation of the media motor 116. By allowing the SOC 212 to manage the switching of analog control signals in the media motor control bus 218, the PIC 214 is greatly simplified and can be further reduced in size and cost. The SOC 212 can implement the commutation logic for driving the media motor 116 in very small and high speed Complementary Metal Oxide Semiconductor (CMOS) digital logic dedicated to that purpose.

The PIC 214 can concurrently provide the HAM control signal 120 and the media motor control bus 218. The functional management of the HAM control signal 120 and the media motor control bus 218 can remain in the SOC 212 while the analog signal drive capability is provided by the PIC 214. This combination can dramatically reduce the cost of the PIC 214, which can be produced in a bipolar technology, such as Silicon Germanium (SiGe), Gallium Arsenide (GaAs), or Bipolar Complementary Metal Oxide Semiconductor (BiCMOS). By reducing the function as well as the size of the PIC 214, the overall system cost can be reduced.

The control circuitry 138 can receive feedback on the position of the head 102 by way of the PES 210. The SOC 212 can interpret the PES 210 in order to determine the response required by the HAM control signal 120 in order to correctly position the head 102. The control of the media motor 116 can be monitored by detecting the frequency of the servo related fields in the servo sectors 114 as well as the time interval between the servo sectors 114.

The communication between the SOC 212 and the PIC 214, across the PWM code bus 216, can operate at digital speeds, while the analog control signals from the PIC 214 have much longer durations. The difference in the speed of the control requirements allows the SOC 212 to toggle the control lines of the HAM control signal 120 and the media motor control bus 218 to assert and negate the individual controls or groups of controls.

It has been discovered that the PWM code bus 216 can reduce the amount of control logic required in the PIC 214, which allows a reduction in the physical size of the integrated circuit of the PIC 214 and reduces the pin count which can further reduce the package geometry of the PIC 214. The additional digital logic required in the SOC 212 can have little or no impact on the size of the die of the SOC 212 while also reducing the pin count of the package the SOC 212 requires. The overall reduction in cost of the SOC 212 and the PIC 214 also provides a smaller package size for both.

Figure 3:
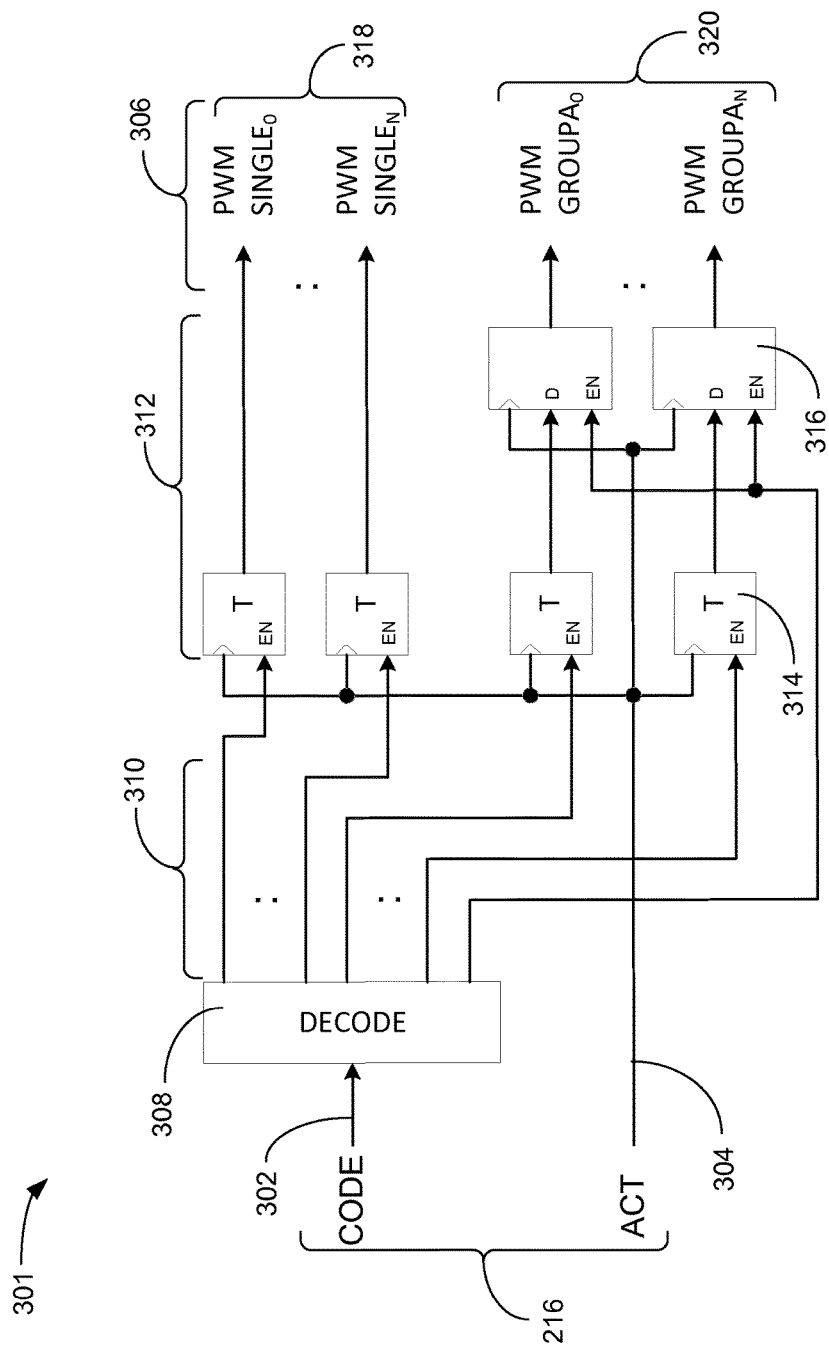
FIG. 3 shows a functional block diagram of a receiver interface for a power integrated circuit (PIC) in an embodiment.

Referring now to FIG. 3, therein is shown a functional block diagram of a receiver interface 301 for a power integrated circuit (PIC) 214 of FIG. 2 in an embodiment. The functional block diagram of the receiver interface 301 depicts the PWM code bus 216, which includes a PWM signal code 302 and an activate (ACT) line 304.

The PWM signal code 302 can be a multi-bit bus having a number of bits to control a plurality of PWM controls 306. By way of an example the PWM signal code 302 can be 5 bits wide in order to activate up to 32 ($2^5$) of the PWM controls 306. The addition of a single additional bit in the PWM signal code 302 can activate up to 64 ($2^6$) of the PWM controls 306.

The PWM signal code 302 can be coupled to an activation decoder 308. The activation decoder 308 can assert a selected enable 310 based on the content of the PWM signal code 302. As an example, the selected enable 310 is only asserted during the period that the PWM signal code 302 is stable. Each of the selected enable 310 can be coupled to an enable input of a storage element 312, such as a toggle flip-flop 314 or a data flip-flop 316. A clock input of the storage element 312 can be coupled to the ACT line 304.

In one embodiment, each of the storage elements 312 can only respond to the activation of the ACT line 304 if the selected enable 310 is present during the negative to positive transition of the ACT line 304. In one embodiment, since the activation decoder 308 only enables one or grouped lines of the selected enable 310, the PWM controls 306 can be managed through the PWM code bus 216.

The PWM controls 306 can be segregated into PWM single controls 318 and PWM group controls 320. The PWM single controls 318 can be utilized to activate a light emitting diode (LED), a flying height control of the head 102 of FIG. 1A, an environmental sensor or the like. The PWM group controls 320 can be used for controlling an H-bridge of the head actuation motor 130 of FIG. 1A or the media motor 116 of FIG. 1A.

The PWM group controls 320 can utilize a pair of the storage element 312. The first of the pair of the storage element 312 can be the toggle flip-flop 314. The second of the pair of the storage element 312 can be the data flip-flop 316 coupled to the toggle flip-flop 314 as a source of the data input. By way of an example, the toggle flip-flop 314 can be asserted then the data flip-flop 316 can be activated to assert the PWM group control 320. The toggle flip-flop 314 can be enabled a second time to negate the output. The PWM group control 320 will remain asserted until the data flip-flop 316 is once again enabled when the toggle flip-flop 314 is negated.

The nature of the PWM controls 306 is a long duration between transitions. As an example, some of the PWM controls can be asserted for 10 to 40 micro-seconds while others of the PWM controls 306 can be asserted for several seconds.

It is understood that the activation period of the PWM signal code 302 can be offset from the ACT line 304 by at least half of the cycle time of the ACT line 304. This assures that the data set-up and hold time requirements of the storage elements 312 are met. It is further understood that the number of the PWM single controls 318 and the PWM group controls 320 is an example only and any combination can be implemented.

Figure 4:
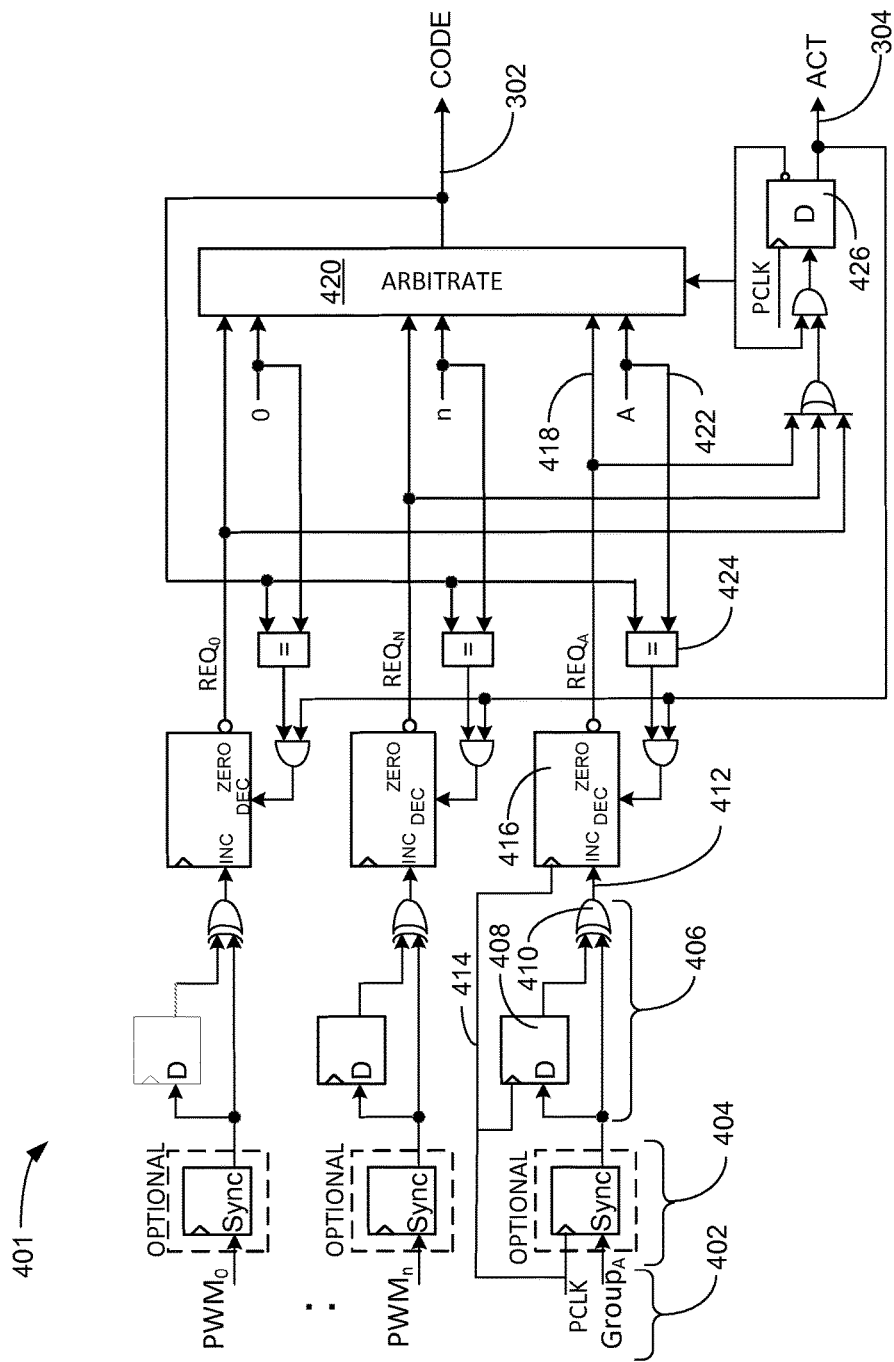
FIG. 4 shows a functional block diagram of a transmitter interface for a system on chip (SOC) in an embodiment.

Referring now to FIG. 4, therein is shown a functional block diagram of a transmitter interface 401 for a system on chip (SOC) 212 of FIG. 2 in an embodiment. The functional block diagram of the transmitter interface 401 depicts the PWM signal code 302 and the ACT line 304 sourced from digital logic in the SOC 212. The transmitter interface 401 can be implemented in high speed digital logic within the SOC 212.

Digital PWM requests 402 are optionally coupled to request synchronizing flip-flops 404. The output of the request synchronizing flip-flops 404 can provide an input to a one cycle pulse circuit 406, including a data flip-flop 408 coupled to an exclusive OR gate 410. When a synchronized request is asserted by the request synchronizing flip-flops 404, a request pulse 412 at the output of the exclusive OR gate 410 is asserted. On the subsequent system clock cycle, the data flip-flop 408 will pass the synchronized request and negate the request pulse 412 of the exclusive OR gate 410. The one cycle of the request pulse 412 is assured because the request synchronizing flip-flops 404 and the data flip-flop 408 are both clocked by the same cycle of a PWM clock (PCLK) 414. In one embodiment, the PCLK 414 is a derivative of the clock used throughout the control circuitry 138 of FIG. 1A. The PCLK 414 can be divided to produce a lower frequency than clock used throughout the control circuitry 138.

As an example, the request pulse 412 can be coupled to a counter element 416, such as a multi-bit counter with increment and decrement controls. The counter element 416 is also clocked by the PCLK 414. In one embodiment, the distribution of the PCLK 414 assures that only a single increment is detected for a separate occurrence of the request pulse 412 but multiple occurrences of the request pulse 412 can be captured. The output of the counter element 416 can be a pending PWM request 418.

In order to manage multiple concurrent instances of the pending PWM request 418, an arbiter circuit 420 can prioritize allowing the pending PWM request 418. When the arbiter circuit 420 allows the pending PWM request 418, a PWM code 422 can be represented on the PWM signal code 302. The value of the PWM code 422 can be fixed to represent a single operation on the PWM signal code 302. As an example, the arbiter circuit 420 can be clocked by the falling edge of the ACT line 304. The timing of the switch in value on the PWM signal code 302 and the ACT line 304 provides ample set-up and hold timing in the PIC 214 of FIG. 2.

When the requested value of the PWM code 422 is gated to the PWM signal code 302, a comparator circuit 424 can detect the match and provide a decrement to the counter element 416. For example, if only one of the request pulses 412 had been detected by the counter element 416, the pending PWM request 418 is negated. If multiples of the request pulses 412 had been detected by the counter element 416, the number of the pending PWM request 418 is reduced by one, but the pending PWM request(s) 418 remains asserted at the arbiter circuit 420.

Any of the pending PWM requests 418 can initiate a cycle of the ACT line 304 through a cycle generator 426. The cycle generator 426 is clocked by the PCLK 414, which will assert the ACT line 304 on a rising edge of the PCLK 414 and negate the ACT line 304 on the subsequent rising edge of the PCLK 414. If additional lines of the pending PWM requests 418 are present, the ACT line 304 will once again be asserted. This cycle will repeat until the pending PWM requests 418 are satisfied, which will leave the ACT line 304 in the negated state.

It is understood that the number of the PWM code 422 is an example and any number of the pending PWM request 418 can be accommodated by changing the number of bits in the PWM signal code 302. The value of the PWM code 422 is coordinated with the PIC 214, but there are no restrictions on the interpretation of the PWM code 422. It is also understood that all of the request synchronizing flip-flops 404, the data flip-flop 408, the counter element 416, and the cycle generator 426 are clocked by the PCLK 414, though for clarity not all of the connections are shown. The arbiter circuit 420 can be switched by the falling edge of the ACT line 304 reflected by the negative output of the cycle generator 426.

Figure 5:
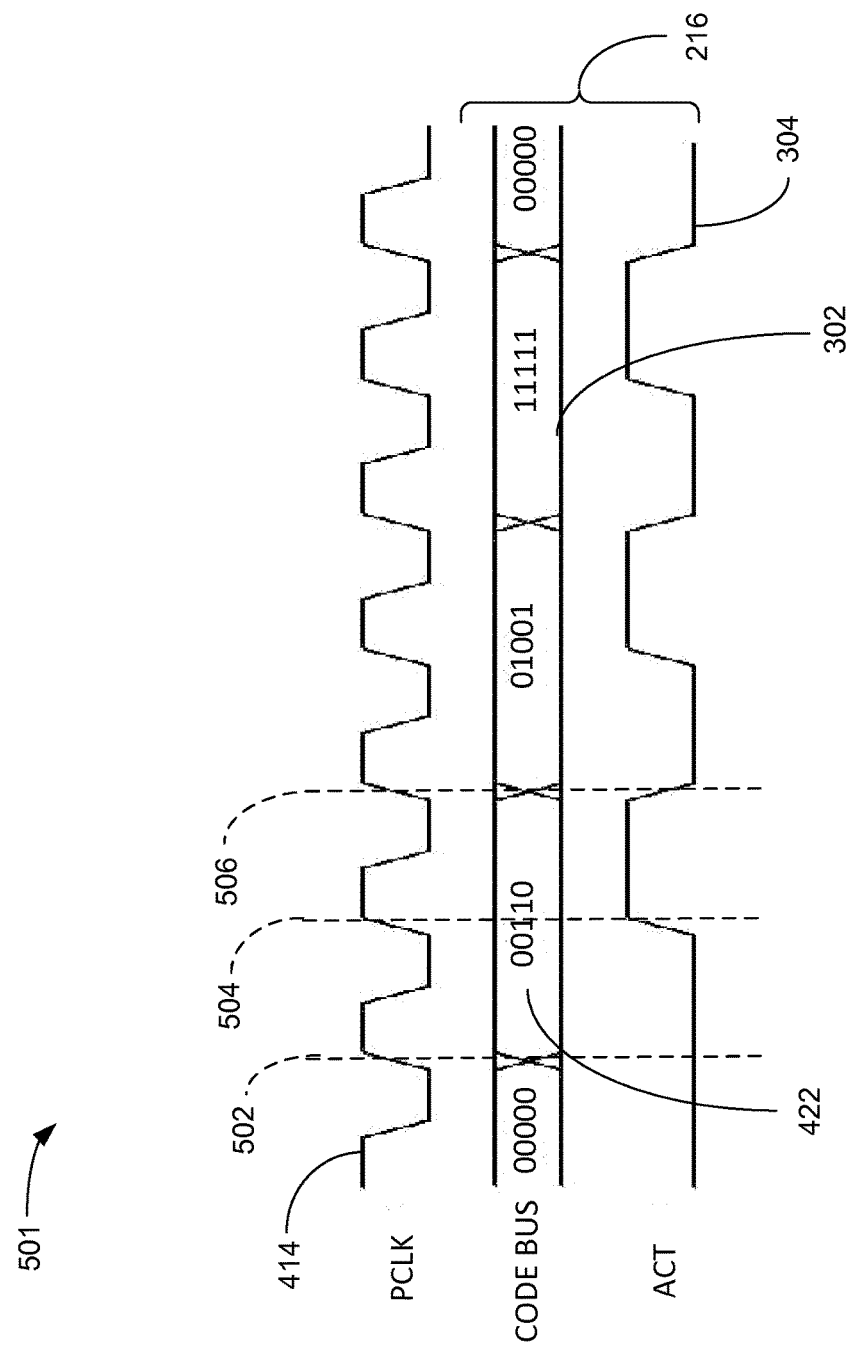
FIG. 5 shows an exemplary timing diagram of the PWM code bus in an embodiment.

Referring now to FIG. 5, therein is shown an exemplary timing diagram 501 of the PWM code bus 216 in an embodiment. The exemplary timing diagram 501 of the PWM code bus 216 depicts the PWM signal code 302 and the ACT line 304 as they relate to the PCLK 414.

The pending PWM request 418 of FIG. 4 can be asserted on an $N^{th}$ rising edge 502 of the PCLK 414. The arbiter circuit 420 of FIG. 4 can pass the PWM code 422 to the PWM signal code 302. By way of an example the PWM signal code 302 is a five bit bus and the pending PWM request 422 can have the code of "00110".

At an $N+1^{th}$ rising edge 504 of the PCLK 414, the ACT line 304 can be asserted. Since the PWM signal code 302 can propagate into the PIC 214 of FIG. 2 and provide the appropriate value of the selected enable 310 of FIG. 3, the assertion of the ACT line 304 can switch the appropriate storage element 312 of FIG. 3 for asserting or removing the PWM controls 306 of FIG. 3.

By way of an example, at an $N+2^{th}$ rising edge 506 of the PCLK 414, the ACT line 304 can be negated and the arbiter circuit 420 can propagate the PWM code 422 of the pending PWM request 418 that is the next priority. In this example, the PWM code 422 having the highest priority is shown to generate the PWM signal code 302 value of "01001". The transfer of the PWM code bus 216 between the SOC 212 of FIG. 2 and the PIC 214 can continue as long as there are any of the pending PWM requests 418. If all of the pending PWM requests 418 have been serviced, the code bus can be forced to a known value, such as "00000" and the ACT line 304 remains negated.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

These and other valuable aspects of an embodiment consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
   media;
   a head over the media;
   a head actuation motor (HAM) coupled to the head; and
   control circuitry, coupled to the head actuation motor, including:
      a system-on-chip (SOC) configured to manage a control of the head actuation motor,
      a pulse width modulation (PWM) code bus, coupled to the SOC, configured to communicate the control of the HAM, the PWM code bus including a PWM signal code and an activation signal, and
      a power integrated circuit (PIC), coupled to the PWM code bus, configured to drive a HAM control signal that controls the HAM based on the control of the HAM communicated by the PWM code signal code and the activation signal,
      wherein an activation period of the PWM signal code is offset from the activation signal by at least one-half of a cycle time of the activation signal.

2. The apparatus as claimed in claim 1 wherein the SOC is further configured to manage control of a media motor.

3. The apparatus as claimed in claim 1 wherein the SOC is further configured to generate a PWM code to adjust the HAM in response to a position error signal (PES).

4. The apparatus as claimed in claim 1 wherein the SOC is further configured to generate a PWM group code for control of a media motor.

5. The apparatus as claimed in claim 1 wherein the PIC is further configured to generate a PWM control to position the HAM.

6. The apparatus as claimed in claim 1 wherein the PIC is further configured to generate a group PWM control to rotate a media motor.

7. The apparatus as claimed in claim 6 wherein the group PWM control further includes PWM control to control a head height of the head.

8. The apparatus according to claim 6 wherein the SOC includes an arbitration circuit to prioritize PWM control requests used to generate the group PWM control.

9. The apparatus as claimed in claim 1 wherein the PIC is further configured to concurrently control a media motor and the HAM.

10. The apparatus as claimed in claim 1 wherein the SOC is further configured to generate a stream of PWM signal codes to control the HAM and a media motor.

11. A method of operating an apparatus, the method comprising:
    managing a head actuation motor (HAM) by a system-on-chip (SOC);
    communicating the control of the HAM through a pulse width modulation (PWM) code bus, the PWM code bus including a PWM signal code and an activation signal; and
    driving a HAM control signal that controls the HAM, from a power integrated circuit (PIC), coupled to the PWM code bus based on the control of the HAM communicated by the PWM code signal code and the activation signal,
    wherein an activation period of the PWM signal code is offset from the activation signal by at least one-half of a cycle time of the activation signal.

12. The method as claimed in claim 11 further comprising managing a media motor by the SOC.

13. The method as claimed in claim 11 further comprising generating a PWM code, by the SOC, for responding to a position error signal (PES) by adjusting the HAM.

14. The method as claimed in claim 11 further comprising generating a PWM group code, by the SOC, for controlling a media motor.

15. The method as claimed in claim 14 wherein the PWM group control further includes PWM control to control a height of a head coupled to the HAM.

16. The method as claimed in claim 14 wherein the method further comprises prioritizing PWM control requests used to generate the PWM group control.

17. The method as claimed in claim 11 further comprising generating a PWM control, by the PIC, for positioning the HAM.

18. The method as claimed in claim 11 further comprising generating a group PWM control, by the PIC, for rotating a media motor.

19. The method as claimed in claim 11 further comprising concurrently controlling a media motor and the HAM by the PIC.

20. The method as claimed in claim 11 further comprising generating a stream of PCM signal codes for controlling the HAM and a media motor.

21. An apparatus comprising:
    control circuitry, coupled to a head actuation motor (HAM), including:
       a system-on-chip (SOC) configured to manage a control of the HAM coupled to a head over a media,
       a pulse width modulation (PWM) code bus, coupled to the SOC, configured to communicate the control of the HAM, the PWM code bus including a PWM signal code and an activation signal, and
       a power integrated circuit (PIC), coupled to the PWM code bus, configured to drive a HAM control signal that controls the HAM based on the control of the HAM communicated by the PWM code signal code and the activation signal,
       wherein an activation period of the PWM signal code is offset from the activation signal by at least one-half of a cycle time of the activation signal.

22. The apparatus as claimed in claim 21 wherein the SOC is further configured to generate a PWM code to adjust the HAM in response to a position error signal (PES).

23. The apparatus as claimed in claim 21 wherein the SOC is further configured to generate a PWM group code for control of a media motor.

24. The apparatus as claimed in claim 21 wherein the PIC is further configured to generate a PWM control to position the HAM.

25. The apparatus as claimed in claim 21 wherein the PIC is further configured to generate a group PWM control to rotate a media motor.

26. The apparatus as claimed in claim 21 wherein the PIC is further configured to control a media motor and the HAM.

27. The apparatus as claimed in claim 21 wherein the SOC is further configured to generate a stream of PWM signal codes to control the HAM and a media motor.

* * * * *